United States Patent
Boche et al.

(10) Patent No.: US 8,023,987 B2
(45) Date of Patent: Sep. 20, 2011

(54) SIGNALING METHOD FOR DECENTRALIZED ALLOCATION OF ONLINE TRANSMISSION POWER IN A WIRELESS NETWORK

(75) Inventors: Holger Boche, Berlin (DE); Slawomir Stanczak, Berlin (DE); Marcin Wiczanowski, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 476 days.

(21) Appl. No.: 12/088,253

(22) PCT Filed: Sep. 18, 2006

(86) PCT No.: PCT/DE2006/001653
§ 371 (c)(1),
(2), (4) Date: Apr. 1, 2009

(87) PCT Pub. No.: WO2007/036200
PCT Pub. Date: Apr. 5, 2007

(65) Prior Publication Data
US 2009/0298526 A1  Dec. 3, 2009

(30) Foreign Application Priority Data
Sep. 28, 2005  (DE) .......................... 10 2005 047 753

(51) Int. Cl.
*H04M 1/00* (2006.01)

(52) U.S. Cl. .............. 455/522; 455/68; 455/69; 455/70; 455/524

(58) Field of Classification Search ................. 455/522, 455/67.11, 68–70, 115.3, 127.1, 127.2, 135, 455/226, 277.2, 296, 501, 502, 509, 511, 455/524; 370/318
See application file for complete search history.

(56) References Cited

U.S. PATENT DOCUMENTS

| 6,519,705 B1 | 2/2003 | Leung | |
| 7,515,531 B2* | 4/2009 | Sinha et al. | 370/224 |
| 7,551,932 B2* | 6/2009 | Hans et al. | 455/465 |
| 2002/0002052 A1* | 1/2002 | McHenry | 455/447 |
| 2003/0078010 A1* | 4/2003 | Davis | 455/69 |
| 2006/0023689 A1* | 2/2006 | Allen et al. | 370/342 |

FOREIGN PATENT DOCUMENTS

| DE | 102 28 342 A1 | 4/2003 |
| WO | 02/03567 A2 | 1/2002 |

OTHER PUBLICATIONS

Official communication issued in counterpart International Application No. PCT/DE2006/001653, mailed on Mar. 15, 2007.
Chiang: "Balancing Transport and Physical Layers in Wireless Multihop Networks: Jointly Optimal Congestion Control and Power Control," IEEE Journal on Selected Areas in Communication; vol. 23; No. 1; Jan. 2005; pp. 104-116.

* cited by examiner

*Primary Examiner* — Dominic E Rego
(74) *Attorney, Agent, or Firm* — Keating & Bennett, LLP

(57) ABSTRACT

The invention relates to distributed wireless ad hoc networks having interfering transmission channels, in which direct links between adjacent transmit nodes and receive nodes in a connection pair are established and optimized. The inventive signaling method alternately uses a primary network and an adjoint network, the respective transmit nodes and receive nodes constantly changing their roles in an agreed time pattern. The transmission signals in the adjoint network are predistorted in such a way that the influence of the proper mobile radio channel is canceled on each transmission channel. The occurring interference is implicitly transmitted as well by the receive nodes and can be directly determined and taken into account by the transmit nodes.

9 Claims, No Drawings

SIGNALING METHOD FOR DECENTRALIZED ALLOCATION OF ONLINE TRANSMISSION POWER IN A WIRELESS NETWORK

TECHNICAL FIELD

The present invention relates to a signaling method for realizing iterative algorithms designed for elastic data traffic according to the best-effort principle for decentralized allocation of online transmission power in a wireless network with i transmit nodes and i' receive nodes forming current directly connected connection pairs ii', in an interfering transmission channel whose reciprocal transmission behavior is known to the receive nodes i'.

The present invention may be applied in distributed mobile networks, such as ad hoc or sensor radio networks with interfering transmission channels. For example, the radio interface may be based on CDMA with non-orthogonal spread sequences. Interference also develops in systems in which a space reuse of transmission channels occurs. The invention is to be applied in wireless networks in which no guarantee with respect to the quality of service in the sense of fulfilling particular requirements, e.g. with respect to the data rate or latency time, is given. Thus, the corresponding algorithms are designed for elastic data traffic and operate according to the best-effort principle, that is, according to the best possible offer of the respectively current resources for the user in the sense of highest fairness towards all users in the network. Thus, a data rate maximization which is not fair towards individual users is out of question, rather, a distribution of transmission power which is fair towards all users is aimed at. Further, the inventive signaling method relates to direct connections between a transmit node and receive node (one-hop ad hoc network). However, indirect connections via intermediate nodes (multi-hop ad hoc network) correspond to a line-up of direct connections so that they may be treated analogously with the inventive signaling method.

As the transmission channels between currently formed connection pairs ii' of a transmit node i and a receive node i' mutually interfere with each other, a suitable coordination of the transmission powers is necessary so as to avoid strong interferences. Thus, the control of transmission power for elastic data traffic is about associating the transmission powers such that a pregiven global utility function becomes maximum. Typically, this problem is equivalent to minimizing the object function, which takes on the form of a linearly weighted sum of QoS parameters (QoS=Quality of Service), for optimizing the allocation of transmission power in the best-effort criterion. Thus, the aim of a good signaling method is to reliably provide, to the respective transmit node, the information for calculating the transmission power vector minimizing the object function, according to the selected optimization algorithm and with an effort as minimum as possible. The calculated power vector is referred to as optimum. In this context, each entry of the power vector represents the transmission power on a transmission channel in a connection pair ii'.

As a rule, the algorithms for determining the optimum power vector are iterative in nature: transmit nodes i start off with a particular transmission power which is then step by step adapted according to a pregiven rule. Good algorithms distinguish themselves by improving with every step (monotony), converging to a global optimum and being close to the optimum already after a few steps. The main problem with implementing such iterative algorithms in distributed wireless mobile networks without any central control unit is that for performing the iteration loops, particular global information is necessitated which is distributed in the network as a gradient of the selected object function with respect to the optimization variable—i.e. the transmission power in the invention.

BACKGROUND

Current development—Over the last years, the rapid development in digital technology has considerably changed the character and the importance of wireless communications in modern society. The data-based applications are becoming more and more important compared to speech transmission, which up to the middle 90ies was the only relevant application in the second-generation mobile radio standard (GSM; GSM=global standard for mobile communications). The change began inconspicuously with making short message services (SMS) popular and subsequently extending the GSM network with higher-rate services (GPRS; GPRS=general packet radio service). In the meantime, the high-rate and partially real-time capable data services have become a fixed mainstay in the third-generation mobile radio standard (UMTS; UMTS=universal mobile telephone system) and will even more rise in importance in the upcoming cellular standards (Beyond 3G).

Nowadays, the most popular data-based user activities in the UMTS network include exchanging multimedia messages (MMS; MMS=multimedia message service), using different download services (music, ring tones) and partly even video telephony, for example. However, the expansion of wireless data services is not limited to cellular mobile radio. It contributed to making the so-called ad hoc network concept popular in private households, which represents a self-organized kind of communication with multiple users and multiple services and, as a rule, does without superordinated communication nodes (as the basis station in the cellular concept) and, thus, is based on physical direct connections between data sources and data sinks. The ad hoc mode is the main principle of operation in the wireless communication standards of the IEEE. The wireless ad hoc applications are numerous both in the industrial and in the private sector and have excellent prospects for the future. The most illustrative examples of use include exchanging large amounts of data between two terminals in different office rooms, a real-time capable instant, i.e. immediate, speech and/or image connection between two remote rooms of a detached house/office building or a wireless sensoric monitoring of an important area (sensor network), for example.

Quality of service in wireless networks—The quality of service (QoS) is experienced by end users subjectively according to criterions such as speech intelligibility, speed of data transfer, and steadiness of the real-time data connection (not jerky). From the engineering point of view, the perceptive criterions as the entirety of all perceptions are associated with so-called QoS parameters. In this context, the level of the signal to interference ratio (SIR, SINR=signal to interference and noise ratio), for example, which is expressed in decibel, may mirror e.g. the speech intelligibility, the data rate (in [bit/s]) corresponds to the transfer speed and the delay times (in [s]) of the data packets are directly related to the real-time capability. Logically, due to the limitation of network resources such as transmission power and bandwidth, it cannot be ruled out that with multiple connections being active at the same time, some end users experience a deficitary quality of service. In this context, the crosstalk between the connections (interference) represents a crucial additional destructive factor. Crosstalk may be avoided by alternately assigning separate time slots, or separating the frequency bands of all connections. However, particularly in ad hoc networks this possibility is out of question due to the high control and synchronization effort.

An example of an ad hoc network with a degradation in the quality of service by interference: four notebooks are located in one office room. The notebooks have pairwise simultaneously set up high-rate wireless direct ad hoc connections, e.g. for transferring two large amounts of data. Due to the relatively small distance between the adjacent transmitters and receivers of both connections, the transmit signals strongly interfere with the receive signals at the respective receivers. This has a destructive influence on the data rates and, thus, on the duration of the both connections. Thus, the both connections need (much) more time for completing the transfer than it would be the case in a single operation.

Optimum allocation of resources—In realistic cases of application, it is not possible to improve the quality of service by increasing the power and bandwidth budgets, due to legal limitations on the transmit signal level on the one hand, and due to the limitation of useable frequency bands (the first and second ISM band, the licensed UMTS bands) on the other hand. For these reason, optimizing the allocation of resources between the network nodes plays an extremely important role. Under consideration of the character of the different connections, it allows the optimum translation of the present power and bandwidth budget into the quality of service perceived by the end users.

Realization of the optimum allocation of resources—The key to efficient allocation of resources lies in the performance of the optimization procedures used, which in the invention are exclusively iterative in nature. What is meant by optimization procedure is the connection of the iterative optimization algorithm with the schemes of the signaling and the feedback signaling between nodes in the network necessary for performing the iterations. What is meant by signaling is the transmission of all data necessitated for controlling the network. The signaling data are thus to be distinguished from the information data containing the actual information to be transmitted.

Online optimization problems—The fast-moving nature of today's networks represents one of the crucial challenges to the algorithms and their implementation. Due to the mobility of the network nodes and packet-oriented data transmission, for example, modern data networks comprise a fast time variability of the topology and data traffic structure. Here, the optimum re-allocation of the resources may follow the time pattern of the changes in topology and data traffic only with a tolerable delay (online optimization). Consequently, apart from accuracy, the implemented algorithms have to comprise sufficiently good convergent properties, that is, they have to achieve the final result fast. As has been shown in practice, these difficulties in cellular communication may easily be overcome. Thanks to a more or less unrestricted energy consumption and a large computing capacity, the basis station allows the implementation of highly complex optimization algorithms. Therefore, it is capable of following the network changes and for timely arranging the re-allocation of the resources in the network, if necessary. In this context, due to the common battery operation of the network nodes and the limitation of device costs per node, the ad hoc networks reach limits determined by energy and computational performance. This contributes to increased requirements with respect to complexity and convergence speed of the optimization procedures used.

Problems in local network knowledge—In cellular networks, the basis station typically has a global knowledge of the network in the form of channel states (the prerequisite for this is the so-called reciprocity of the channel, which, however, is valid in all network scenarios relevant for the practice), kinds of data traffic and requirements with respect to the quality of service, and, thus, is predestinated for the centralized execution of the online optimization of the allocation of resources. By signaling, it arranges for the (re)allocation of the resources only after each optimization pass—for the uplink—or it (re)allocates its resources itself—for the downlink. A similar procedure in ad hoc networks is inhibited by their decentralization, which means that, as a rule, none of the network nodes is superordinated and, thus, the global knowledge of the network parameters, i.e. the channel states between all nodes (transmit nodes, receive nodes) or the strengths of the interference between all connections, is not present at any of the nodes. As a rule, network nodes have at most local knowledge of the network, e.g. in the form of channel states or interference strengths in the close environment, which may originate from a local signaling between the neighbor nodes. One of the important reasons for the absence of the global network knowledge at the nodes in the ad hoc network may be the spatial distribution of the network. In such a case, the receive nodes might not be directly accessible by the transmit nodes under some circumstances, and, thus, the latter are forced to communicate via intermediate nodes (so-called "multi-hop transmission"). However, the value of the invention becomes already apparent when considering the cellular and so-called one-hop ad hoc networks, i.e. such which allow direct connections over the full area. Therefore, an explicit consideration of multi-hop problems is omitted in this document, to which, however, the invention may be analogously applied.

Concept of the centralized realization of allocation of online resources—A possibility to overcome this difficulty in ad hoc networks is to introduce a virtual cellular infrastructure by nominating a superordinated node to which the global knowledge of the network parameters is provided by transmission of the local knowledge of all nodes. The nominated node takes on the function of the basis station, performs a centralized optimization and arranges for a (re)allocation of the resources in the network by signaling. In ad hoc networks, the realization of the allocation of online resources by help of the virtual cellular structure is the most obvious concept. Here, the advantage lies in the applicability of centralized optimization algorithms based on a well-developed general algorithmic optimization theory. Over the last years, numerous network-specific algorithmic solutions for special criterions for the allocation of resources have developed. The significant disadvantage of the realization approach with a virtual cellular structure lies in the signaling necessitating a lot of effort which, on the one hand, significantly delays the (re)allocation of the resources and, on the other hand, is a burden to the battery runtimes of all network nodes. It is the virtual basis station (the nominated nodes) in particular which has to perform calculation operations necessitating a lot of effort that is at a disadvantage.

Concept of the decentralized realization of the allocation of online resources—Taking the afore-mentioned considerations into account, the competing realization concept based on distributed network actions without global cooperation is the more advantageous one for ad hoc networks. In this concept, the network nodes follow a fixed local action scheme, which, as a rule, is iterative in nature, independently of each other. Local signaling may also belong to the individual steps of the scheme, e.g. with respect to the neighbor nodes or to a specific node. The more effort the signaling necessitates, the smaller its advantage over the concept of the centralized realization. The result of such actions distributed in the network is the knowledge of optimum assignments of resources at the respective network nodes. In the last years, some decentralized optimization procedures for diverse criterions for the allocation of resources have been developed. However, for the majority of the relevant allocation criterions, decentralized realization concepts worth mentioning do not yet exist.

As already set forth above, the main problem in the implementation of iterative algorithms for determining the optimum allocation of transmission power in distributed wireless mobile radio networks without any central control unit is to obtain global information necessitated for performing the iteration loops, which is distributed as a gradient of the transmission power in the network.

Known common solution approaches: Usually, global information is exchanged between all nodes by help of a "flooding protocol". This is the simplest algorithm for information distribution in a distributed network. In this process, an initiator locally sends a message to all its neighbors. Each which obtains the message and has not been informed yet passes it on to all its neighbors, compare publication by Mung Chiang, "Balancing Transport and Physical Layers in Wireless Multihop Networks: Jointly Optimal Congestion Control ans Power Control" (IEEE Journal of Selected Areas in Communications, Vol. 23, No. 1, January 2005, pp. 104-116), on which the present invention is based. However, such a procedure leads to wasting scarce resources (bandwidth and power) in mobile radio systems and, thus, is inacceptable for many applications.

SUMMARY

An embodiment may have a signaling method for translating iterative algorithms formed according to the best-effort principle for elastic data traffic for decentralized allocation of online transmission power in a wireless network with i transmit nodes and i' receive nodes forming current directly connection pairs ii', in an interfering transmission channel whose reciprocal transmission behavior is known at the receive nodes i', in which a primary network is defined by a wireless data traffic of information data to be transmitted and network-controlling signaling data in the interfering transmission channel from the transmit nodes i to the receive nodes i' in each connection pair ii', wherein the primary network also includes directional orthogonal low-rate control channels and back channels in each connection pair ii', and in which an adjoint network is defined by a wireless data traffic of the signaling data in the interfering transmission channel from the receive nodes i' to the transmit nodes i in each connection pair ii', wherein the primary network and the adjoint network are alternately used, during the wireless data traffic, for providing the information on the current power state in the network necessary for iterative gradient forming in a selected iterative gradient-based algorithm, wherein, in the primary network, signaling data are globally synchronously transmitted via the interfering transmission channel in a time pattern agreed between all transmit nodes i, signaling data are locally transmitted via the control channels in each connection pair ii' with respect to the changeable weighting of the connection priorities, signaling data are locally transmitted via the back channels in each connection pair ii' with respect to the current state of the transmission channel and a first transmission power matching is performed in the transmit nodes i and wherein, in the adjoint network, the signaling data are predistorted at the receive nodes i' for compensating the influence of the transmission channel respectively formed in a connection pair ii' on the interfering transmission channel, the predistorted signaling data are globally synchronously transmitted in a time pattern agreed between all receive nodes i' via the interfering transmission channel to the transmit nodes i in the connection pairs ii', and the information on the power state in the network needed for calculating the i-th gradient components in the selected iterative algorithm is calculated, in the transmit nodes i, from the received predistorted signaling data.

Based on the generic signaling method known from the above-mentioned publication, against the background of the afore-described general problems in wireless networks with a decentralized allocation of online transmission power, the object underlying the invention is to indicate a signaling method in which the gradient formation necessitated for performing the iterative algorithms occurs, with respect to the transmission power, as global network information in a particularly simple, resource-saving and instant manner, so that an efficient decentralized implementation of the gradient-based iterative algorithms is possible. The inventive solution for this object may be taken from the comprehensive patent claim and in the following will be explained in general and detailed in a particular embodiment.

The inventive solution suggests an alternate use of a primary network and an adjoint network. In this context, the respective transmit nodes and receive nodes in the current connection pairs change their roles. The transmit signals in the adjoint network are predistorted such that the influence of the "proprietary" mobile channel is eliminated on each transmission channel in a current connection pair ii'. Each connection pair ii' is provided with a low-rate control and back channel (orthogonal and, thus, without interference) used in the primary network. Via the back channel, the local interference in the connection pair is reported to the respective transmit node. Therefrom, this node determines a first necessitated transmission power (local transmission power). The transmit node implicitly gets to know of the global interference between the transmit node and all other receive nodes by the feedback signaling from its current receive node via the transmission channel under compensation of the local interference, and therefrom, it determines a second transmission power. Since the necessitated transmission power for the local interference is already known at the transmit node via the back channel, it may now directly determine the necessitated global transmission power by subtracting the known local transmission power from the second determined transmission power. The gradient in the iteration step n+1, in dependence on the transmission power, then results from the subtraction of the global transmission power from the local transmission power in iteration step n. An information transfer between all nodes, as known in the flooding protocol, is omitted since the global information necessitated for gradient forming is determined directly from superimposed back signals.

The inventive signaling method for translating iterative algorithms designed according to the best-effort principle for elastic data traffic for decentralized allocation of online transmission power in a wireless network with i transmit nodes and i' receive nodes in an interfering transmission channel, whose reciprocal transmission behavior is known at the receive node i', comprises the following features substantial to the invention:

Definition of a primary network by a wireless data traffic of information data to be transmitted and network-controlling signaling data in the interfering transmission channel from the transmit nodes i to the receive nodes i' in each connection pair ii'. Here, the primary network locally also includes directional orthogonal low-rate control and back channels locally in each connection pair ii'.

Definition of an adjoint network by a wireless data traffic of the signalization data in the interfering transmission channel from the receive nodes i' to the transmit nodes i in each connection pair ii'.

Alternate use of the primary network and the adjoint network during the wireless data traffic for providing the information on the current power state in the network, which is needed for the iterative gradient forming in a selected iterative gradient-based algorithm.

During the alternate use, signaling data are globally synchronously transmitted in the primary network in a time-pattern agreed between all transmit nodes i via the interfering transmission channel, locally in each connection pair ii' via the control channels with respect to a changeable weighting of the connection priority, and via the back channels with respect to the current state of the transmission channel. A first transmission matching is performed in the transmit nodes i.

During the alternate use, the signaling data are predistorted in the adjoint network at the receive nodes i' for compensation of the influence of the directional transmission channel, respectively formed in a current connection pair ii', on the interfering transmission channel, and the predistorted signaling data are globally synchronously transmitted in a time pattern agreed by all receive nodes i' via the interfering transmission channel to the transmit nodes i in the connection pairs ii'. Then, the information reflecting the current interference and transmission power state of the network, which is needed for calculating the i-th gradient components in the selected iterative algorithm, is determined in the transmit nodes i from the received predistorted signaling data.

Thus, the entire signaling procedure of the inventive signaling method comprises four parts:

1. In the primary network, each transmit node i informs the receive node i' of the current weighting of the connection to be currently established with respect to its priority in the wireless network, via the respective direct control channel in the connection pair ii'. However, this is only necessary if this variable has changed and the receive nodes i' do not pocess this information. Further information, such as the transmission power used, may also be passed on. Additionally, the receive nodes i' have to know the current transmit channel, as in each coherent method. It should be noted that here only a local communication occurs between adjacent transmit and receive nodes (one hop, analogously applicable to multi hop).

2. Using the primary network: All transmit nodes in the primary network transmit synchronously in a fixed time pattern agreed between all transmit nodes i. It is the actual information data and also pilot symbols that are transmitted. The receive nodes respectively estimate the signal to interference ratio and the interference power by averaging via a series of pilot symbols.

3. In the primary network, each receive node i' informs the transmit node i about the current signal to interference ratio (or a function dependent on the SIR) via the respective back channel in the connection pair ii'.

4. Using the adjoint network: All receive nodes (or transmit nodes in the adjoint network) synchronously transmit an accordingly predistorted signal. The transmit nodes (or receive nodes in the adjoint network) estimate the power of the respective current receive signal by averaging via a series of pilot symbols. This power is then used as a basis for calculating the gradient for the iterative algorithm.

With the invention, a concept of decentralized signaling is claimed, which is used in the context of iterative optimization of the allocation of transmission power in the sense of a so-called best-effort criterion. For the explanations in the following sections b, c and the embodiment, a fixed assignment of medium resources is assumed, e.g. the assignment of spread sequences in a CDMA network (CDMA=code division multiple access) or the allocation of frequency bands in an FDMA network (FDMA=frequency division multiple access). Thus, the optimization of the allocation of resources is reduced to an optimization of the allocation of transmission power. For presenting the embodiment of the signaling method according to the invention, three intermediate steps are needed. In section a, the mode of operation of the signaling method and, thus, the use of the adjoint network are defined and explained by way of example. Further, the predistortion necessitated for the signaling method according to the invention is explained. In the following section b, the basic principles of the theory of the allocation of resources according to the best-effort criterion are presented. In section c, the principle of the iterative optimization of the allocation of resources (with any criterion) is briefly presented. With these explanations, the embodiment of the signaling method according to the invention will easily be understood and comprehended.

a. Transmit Strategy of the Adjoint Network

Before setting up the connections in the cellular and in the ad hoc network, the receive nodes are informed of the upcoming communication. This is made from the corresponding transmit nodes by transmitting signaling sequences (e.g. with pilot signals and data traffic information) via the control channels. As a rule, using the allocation of online resources, back signaling through the receive nodes is subsequently needed. In this context, it generally depends on the realization concept whether the back signaling is global (concept of the centralized realization of the allocation of online resources, see above) or local (concept of the decentralized realization of the allocation of online resources as a basis for the signaling method according to the invention, see above) in nature, and, in particular, on whether it is addressed to all transmit nodes or only to the associated transmit node.

For clarity of illustration, it shall be assumed that K transmit nodes intend to communicate with K other receive nodes in an ad hoc network, wherein none of the receive nodes receives several connections and none of the transmit nodes sets up connections with multiple receive nodes.

Definition: A transmit strategy of the adjoint network in the signaling method according to the invention is defined as a back signaling scheme in which K receive nodes transmit synchronously and apply a pre-equalization of the channel to the respective transmit node. By synchrony it is meant that there is a time interval regularly repeating itself in a pattern, in which all receive nodes transmit.

The following example shows the application of the transmit strategy of the adjoint network in the backsignaling in an ad hoc network. An ad hoc network with eight nodes is considered. At the point of time considered, four direct connections between the nodes i and i', i=1, . . . , 4 are to be set up at the same time. The receive nodes are indexed by indices with an apostrophe. Each transmit node i generates an interference to all neighboring receive nodes i' which are taken into account with the interference factors (e.g. an interference between transmit node 3 and receive node 2': interference factor V32', interference between transmit node V34', interference between transmit node 3 and receive node 4': interference factor V34', interference between transmit node 3 and receive node 1': interference factor V31' etc.). A transmission with a flat channel fading is assumed, in which the basis band channel impulse response may be expressed by a complex-valued channel coefficient, as is generally known. The coefficient of the channel between the j-th and the i'-th node is designated with hji'.

The interference ratios are defined to:

$$V_{ji'} := \frac{|h_{ji'}|^2}{|h_{ii'}|^2}, j \neq i, i, j = 1, \ldots, 4, \quad (1)$$

and referred to as interference factors. If $h_{ji} \gg h_{ii}$, applies, $V_{ji}$, theoretically becomes infinite. In practice, this would mean that the channel $h_{ii}$, is too weak in relation to the potential interference of the j-th transmit node and the connection between the i-th transmit node and the i'-th receive node cannot be set up. In deviation from equation (1), $V_{ii'}:=0$ is defined and all defined interference factors are grouped in the matrix $V:=[V_{ij'}]$ which is referred to as the interference matrix of the network.

In this case, the signaling procedure using the transmit strategy of the adjoint network in the back signaling is then as follows:

1. Initially, the receive nodes i', i=1, ..., 4 are reliably informed, e.g. by a time- or frequency-separated signaling, of the connection intention by the respective transmit nodes i, i=1, ..., 4. In this context, signaling data along with pilot signals are possibly already transmitted.
2. Each receive node i', i=1, ..., 4 is capable of calculating a reliable estimate of the channel coefficient $h_{ii'}$, from the pilot signal. For this, numerous proven estimating methods are known.
3. The receive nodes i' establish a common point of time of the back signaling, which must be met only roughly. Its determination may be made separately at each receive node, e.g. by help of so-called time stamps, signature bits or the global positioning system (GPS).
4. Subsequently, the back signaling is made by the transmit strategy of the adjoint network: all receive nodes i' start the back signaling at the point in time previously determined. Here, the transmit signal of each receive node i', i=1, ..., 4 is multiplied by the inverse of the calculated channel estimate, i.e. by $$\frac{1}{h_{ii'}}.$$

This multiplication corresponds, in the sense of mobile communication, to the pre-equalization in a flat channel fading and is also well-known. In the general case of the frequency-selective channel fading, the transmit signals would have to be convoluted with the impulse response of the inverted channel frequency response.

In step 4, the power levels of the transmit signals and the contained information depend on the used algorithm of the allocation of online resources. In the back signaling, the receive nodes take on the role of the transmit nodes, and, vice versa, the transmit nodes become the receive nodes. It also follows that during the backsignaling according to step 4, the interference matrix U of the developed network with the described role swapping is equal to the transposed matrix of the original network, i.e. $U=V^T$. Mathematically speaking, the transposition in the considered case of definite-dimensional separable matrix space thus corresponds to the superordinated term of adjunction in the operator theory. Thus, the name of the transmit strategy of the adjoint network is used for the backsignaling scheme described.

b. Best-effort Criterion of the Allocation of Transmission Power in the Ad Hoc Network An ad hoc network as described above is considered; This time, with a general number K of transmit nodes and the same number of receive nodes. Thus, K connections active at the same time are assumed, each between the transmit node i and the receive node i', i=1, ..., K. The connections are indexed with the index of the respective transmit node. When linear receivers are assumed, the reception quality of each connection is reflected by the level of the associated SINRs. The SINR of the i-th connection, designated as $\gamma_i$, may be represented as a function of all transmission powers $p=(p_1, \ldots, p_K)$ in the form $$\gamma_i = \gamma_i(p) = \frac{p_i}{\sum_{k=1,k\neq i}^{K} V_{ki'} p_k + n_{i'}}, i = 1, \ldots, K \quad (2)$$

wherein $n_{i'}$ designates the noise power at the i'-th receive node. The SINR-dependent QoS parameter of the i-th connection may be expressed as a function $\gamma_i \rightarrow \phi(\gamma_i)$. Without restrictions on generality, the consideration may be restricted to non-increasing functions $\phi$, since for non-decreasing functions $\phi(\gamma)$, such as the data rate, the negative function may be considered, which is also generally known. Standard examples for QoS parameters are $\phi(\gamma)=-\log(1+\gamma)$ as negative data rate or $$\phi(\gamma) = \frac{1}{\gamma}$$

as decrease in the bit error rate. Generally, a selection may be made between different QoS parameters from a certain class without destroying the efficient online solution possibilities for the problem of the allocation of transmission power according to the best-effort criterion. In this context, also different QoS parameters from this class may be nominated for each connection.

The object function of the optimization of the allocation of transmission power in the best-effort criterion then takes on the form of a linearly weighted sum of QoS parameters, i.e.

$$f(p) = \sum_{i=1}^{K} \alpha_i \phi(\gamma_i(p)), 0 \leq \alpha_i \leq 1, i = 1, \ldots, K. \quad (3)$$

The object function represents an intuitive global measure for the quality of service of the entire network. The normalized weights $\alpha_i$ in this context correspond to the priorities of the connections, which are mostly determined by the kind of data traffic. The optimum allocation of transmission power in the sense of the best-effort results from the solution of the problem $$\min_{p \in P} f(p), P = \{p : 0 \leq p \leq p_{max}\}. \quad (4)$$

with the vector $p_{max}=(p_1^{max}, \ldots, p_K^{max}))$ as the vector of the transmission power restrictions of the transmit nodes. The best effort criterion and the associated optimization problem have already been dealt with in literature in connection both with wired and wireless networks.

c. Iterative Optimization of the Allocation of Transmission Power

The calculation of the optimum allocation of transmission power, such as the calculation of the solution for the problem according to equation (4) in the case of the best-effort criterion, is made iteratively in most networks. For this, well-developed methods of iterative optimization, which are well-known, are used. Here, f be the object function of any criterion of the allocation of transmission power, such as equation (3). The standard form of the iteration loop (of the n-th iteration loop, n∈N) of an algorithm of the allocation of transmission power may accordingly be described as follows. In this context, all dependencies and transformations in the iteration are initialized by channel states, noise levels and other system parameters. For simplicity, this is not explicitly illustrated in the notation.

1. Allocation p(n−1) as result of the (n−1)-th iteration is present.
2. Bijective transformation $x(n-1):=H(p(n-1)), H:R_+^K \to I \subseteq R^K$.

3. Calculation of the step width s=s(x(n−1)), e.g. according to the known backtracking method.
4. Calculation of the search direction Δx(n)=Δx(x(n−1)), e.g. [3]
   Δx(n)=∇²f(x(n−1))⁻¹∇f (x(n−1)) in the Newton method,
   Δx(n)=argmin{∇f(x(n−1))ᵀv|‖v‖₁=1} in the steepest descent method,
   Δx(n)=−T(x(n−1))⁻¹∇f(x(n−1)) with T(x(n−1)) as a method-specific matrix function, in all quasi Newton methods (BFGS method, method of the conjugated gradients etc.),
   Δx(n)=−∇f(x(n−1)) in the gradient method.
   Note: Gradient formation is necessitated in all previously shown methods for calculation of the search direction.
5. Calculation of the new transformed allocation x(n)=x(n−1)+sΔx(n)
6. Calculation of the back transformation p(n):=H⁻¹(x(n)).
7. Substitution: n:=n+1, back to 1).

The bijective transformation and back transformation in steps 2 and 6 does not have to be performed in each iteration, that is, the presented iteration form may also be considered as an optimization iteration via x as direct argument. Possibly, however, the back transformation to p in intervals of some iterations is reasonable to directly control the transmission powers, e.g. with respect to exceeding the admitted level of transmission power. The form of the transformation H may have a decisive influence on the convergence properties of the algorithm.

DETAILED DESCRIPTION

With the signalization method according to the invention, the use of the transmit strategy of the adjoint network as a back signaling scheme in the calculation of the search direction, i.e. in step 4) of the iteration form presented in section c) and in all iterative methods of optimization according to equation (3), i.e. in the optimization of the allocation of transmission power according to the best-effort criterion, is claimed. The following example shows a detailed procedure of the signaling and back signaling according to the inventive signaling method applying an iterative optimization algorithm according to section c.

An example for an ad hoc network with the best-effort criterion with the data rate as QoS parameter applying the gradient optimization method with fixed step size:

The ad hoc network as described above with K transmit and receive nodes, flat channel fading, individual transmission power restrictions of each node and a CDMA medium access is assumed. With the best-effort criterion, the data rate is established as the only relevant QoS parameter. The (negative) data rate of the connection is approximated as a function of the associated SINRs with $\phi(\gamma)=-\log(\gamma)$. Thus, the object function according to equation (3) takes on the form $$f(p) = -\sum_{i=1}^{K} \alpha_i \log(\gamma_i(p)), 0 \le \alpha_i \le 1, i = 1, \ldots, K. \quad (5)$$

The step size of the iterative optimization is fixedly defined equal to s and is known at all network nodes. No transformation H of the argument is used, or an identity transformation H(p)=Ip is used. It follows that the gradient of (5) may be expressed by $$\nabla f(p) = g(p) - v^T \Gamma(p) g(p), \quad (6)$$

with $$\Gamma(p):=\text{diag}(\gamma_1(p), \ldots, \gamma_K(p)) \quad (7)$$

and $g(p)=(g_1(p), \ldots, g_K(p))$, with $$g_i(p) = g_i(p_i) := \frac{\alpha_i}{p_i} \quad (8)$$

The setup of the connection is made according to steps 1 and 2 in section a. Each transmit node i reliably signals its connection intention to the respective receive node i' and informs it of the priority $\alpha_i$ of the upcoming connection. Each receive node i calculates the estimate of the channel coefficient $h_{ii'}$ from the pilot signals received. By help of time stamps or the GPS system, each receive node establishes a time pattern of the synchronous back signaling, as described in step 3 of section a. A correspondingly shifted time pattern of the synchronous transmission is also established by the transmit nodes. After this initialization phase, iterations of the optimization procedure connecting the optimization iterations according to the gradient method (particular case of the form in section c) with the signaling and back signaling of section are made. The n-th iteration, n∈N, may be described as follows.

1. All transmit nodes synchronously transmit in the established time pattern with powers of the allocation p(n−1)∈P, which resulted from the (n−1)-th iteration.
2. Each receive node i' receives a signal with the power $$r_{i'}(p(n-1)) = p_i(n-1) + \sum_{j \ne i} V_{ji'} p_j(n-1) + n_{i'} \quad (9)$$

3. When averaging via a series of pilot or data symbols, the transmission power $p_i$ and later the overall noise and interference power $$r_{i'}(p(n-1)) - p_i(n-1) = \sum_{j \ne i} V_{ji'} p_j(n-1) + n_{i'} \quad (10)$$

may be determined at each receive node i'. Therefore, also the SINR of the connection $$\gamma_i(p(n-1)) = \frac{p_i(n-1)}{\sum_{j \neq i} V_{ji'} p_j(n-1) + n_{i'}} \quad (11)$$

is known at each receive node i'.

4. Each receive node i' reliably transmits, e.g. by a time- or frequency-separated transmission, the value $$g_i(p_i(n-1)) = \frac{\alpha_i}{p_i(n-1)}$$

to the transmit node i.

5. Each receive node i' selects the value $\gamma_i(p(n-1))g_i(p_i(n-1))$ for its transmission power. All receive nodes transmit with the selected powers with the transmit strategy of the adjoint network according to the definition shown above or according to step 4 in section a.

This means that the actually transmitted power of the i'-th receive node is $\gamma_i(p(n-1))g_i(p_i(n-1))/|h_{ii'}|^2$.

6. In this context, each transmit node i receives a signal with the power $$r_i^*(p(n-1)) = \quad (12)$$
$$\gamma_i(p(n-1))g_i(p_i(n-1)) + \sum_{j \neq i} V_{ij'}\gamma_j(p(n-1))g_j(p_j(n-1)) + n_i^*$$

7. Similar to step 3 in section a, when averaging via a series of pilot or data symbols, the transmission power $\gamma_i(p(n-1))g_i(p_i(n-1))$ of the associated receive node i' is determined at each transmit node i.

8. With knowledge of the noise power $n_i^*$ (receiver-specific magnitude), $g_i(p_i(n-1))$ and $\gamma_i(p(n-1))g_i(p_i(n-1))$ each transmit node i forms the sum $$\delta_i(p(n-1)) = \quad (13)$$
$$r_i^*(p(n-1))\gamma_i(p(n-1))g_i(p_i(n-1)) + g_i(p_i(n-1)) - n_i^* =$$
$$g_i(p_i(n-1)) + \sum_{j \neq i} V_{ij'}\gamma_j(p(n-1))g_j(p_j(n-1)),$$

which corresponds to the partial derivative of equation (5) after the i-th transmission power, or to the i-th component of the gradient according to equation (6).

9. Each transmit node i updates its transmission power according to $$p_i(n) = p_i(n-1) - s\delta_i(p(n-1)). \quad (14)$$

The total of these local updates corresponds to the general update step 5 of section b.

10. If the updated transmission power $p_i(n)$ exceeds the maximum admitted transmission power $p_i^{max}$ of the i-th transmit node, the transmission power is reset to $p_i(n) = p_i^{max}$ 11. Substitution n:=n+1 and transition to step 1.

The important advantage of the signaling method according to the invention will be readily appreciated by the embodiment previously shown. The use of the transmission strategy of the adjoint network in the backsignaling (step 5) in the embodiment allows the provision of knowledge of the partial derivative of the object function after the i-th transmission power at each i-th transmit node, without any cooperation between the receive nodes and between the transmit nodes. It may be easily shown that this applies not only in the case of the gradient method in the example, but also at least in the case of those iterative optimization methods which prescribe a calculation of the search direction (step 4) in section b according to $$\Delta x(n) = -\text{diag}(t)\nabla f(x(n-1)), \quad (15)$$

wherein the diagonal matrix may depend on the current value of the optimization variable. The total of the knowledges of the partial derivatives of the object function at the transmit nodes allows a decentralized execution of the update step of the optimization algorithm (step 5) in section b. The only prerequisite for using the transmit strategy of the adjoint network in back signaling is the rough synchrony, as explained, among other things, in the definition. This, however, may be ensured in practice without major problems.

The consideration of the expression of the partial derivative according to equation (13) also allows a kind of a quantitative comparison of effort with a simple alternative method of back signaling. The interference term on the right side of equation (13) may be provided for the transmit node by a once-only synchronous transmission—by use of the transmit strategy of the adjoint network. A simple alternative back signaling for providing this interference term for transmit node i includes a row of time-separate back signalings from all receive nodes j', j≠i, with the transmission powers $\gamma_j(p(n-1))g_j(p_j(n-1))$. To perform this, a fixed transmitting order of all receive nodes j', which may only be established by help of an additional signaling, is necessary. The back signaling as a row of time-separate transmissions accordingly takes more time than the signaling method according to the invention and, thus, increases the inertness of the entire (re)allocation procedure. Thus, when assuming K connections active at the same time, it may be said in summary that the back signaling with use of the transmit strategy of the adjoint network does with 1/K of the signaling effort and 1/K of the signaling time of this alternative method. Thus, significant technical advantages with respect to devices and users result in an ad hoc network.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Signaling method for translating iterative algorithms designed according to the best-effort principle for elastic data traffic for decentralized allocation of online transmission power in a wireless network with i transmit nodes and i' receive nodes forming current directly connected connection pairs ii', in an interfering transmission channel whose reciprocal transmission behavior is known at the receive nodes i', in which a primary network is defined by a wireless data traffic of information data to be transmitted and network-controlling signaling data in the interfering transmission channel from the transmit nodes i to the receive nodes i' in each connection pair ii', wherein the primary network also includes directional orthogonal low-rate control channels and back channels in each connection pair ii', and in which an adjoint network is defined by a wireless data traffic of the signaling data in the interfering transmission channel from the receive nodes i' to the transmit nodes i in each connection pair ii', wherein the primary network and the adjoint network are alternately used, during the wireless data traffic, for providing the information on the current power state in the network necessary for iterative calculation of the search direction in a selected iterative optimization algorithm, wherein, in the primary network, signaling data are globally synchronously transmitted via the interfering transmission channel in a time pattern agreed between all transmit nodes i, signaling data are locally transmitted via the control channels in each connection pair ii' with respect to the changeable weighting of the connection priorities, signaling data are locally transmitted via the back channels in each connection pair ii' with respect to the current state of the transmission channel and a first transmission power matching is performed in the transmit nodes i and wherein, in the adjoint network, the signaling data are predistorted at the receive nodes i' for compensating the influence of the transmission channel respectively formed in a connection pair ii' on the interfering transmission channel, the predistorted signaling data are globally synchronously transmitted in a time pattern agreed between all receive nodes i' via the interfering transmission channel to the transmit nodes i in the connection pairs ii', and the information on the power state in the network needed for calculating the i-th search direction components in the selected iterative algorithm is calculated, in the transmit nodes i, from the received predistorted signaling data.

2. Signaling method of claim 1, wherein the optimization algorithm is a gradient-based algorithm and the information on the power state necessary for the calculation of the i-th gradient components in the selected iterative algorithm is determined in the determination.

3. Transmit node for a wireless network with decentralized allocation of online transmission power according to an iterative algorithm designed according to the best-effort principle for elastic data traffic, the wireless network comprising i transmit nodes and i' receive nodes forming current directly connected connection pairs ii', and an interfering transmission channel whose reciprocal transmission behavior is known at the receive nodes i', wherein a primary network is defined by a wireless data traffic of information data to be transmitted and network-controlling signaling data in the interfering transmission channel from the transmit nodes i to the receive nodes i' in each connection pair ii', and the primary network also includes directional orthogonal low-rate control channels and back channels in each connection pair ii', and wherein an adjoint network is defined by a wireless data traffic of the signaling data in the interfering transmission channel from the receive nodes i' to the transmit nodes i in each connection pair ii', the transmit node being configured for alternately using, during the wireless data traffic, the primary network and the adjoint network for providing the information on the current power state in the network necessary for iterative calculation of the search direction in a selected iterative optimization algorithm, by transmitting data symbols and pilot symbols synchronously to the other transmit nodes via the interfering transmission channel in a time pattern agreed between all transmit nodes i, receiving a signal to interference ratio or a function dependent thereon determined at the associated receive node by notification via the pilot or data symbols, locally via the control channel, receiving, in the adjoint network, a signal resulting from a synchronous transmission of signaling data, via the interfering transmission channel, in a time pattern agreed upon among all receive nodes i', from the receive nodes i' to the transmit nodes i in the connection pairs ii', which are predistorted for compensating the influence of the transmission channel respectively formed in a connection pair ii' on the interfering transmission channel, and determining, from the received predistorted signaling data, the information on the power state in the network needed for calculating the i-th search direction components in the selected iterative algorithm.

4. Transmit node of claim 3, wherein the transmit node is configured, in the determining of the information on the power state in the network needed for the calculation of the i-th search direction components in the selected iterative algorithm, for estimating a transmission power of the associated receive node from the predistorted signaling data, and calculating the i-th search direction components in the selected iterative algorithm on the basis on the estimated transmission power and the signal to interference ratio, or a subfunction thereof or a function related thereto.

5. Receive node for a wireless network with decentralized allocation of online transmission power according to an iterative algorithm designed according to the best-effort principle for elastic data traffic, the wireless network comprising i transmit nodes and i' receive nodes forming current directly connected connection pairs ii', and an interfering transmission channel whose reciprocal transmission behavior is known at the receive nodes i', wherein a primary network is defined by a wireless data traffic of information data to be transmitted and network-controlling signaling data in the interfering transmission channel from the transmit nodes i to the receive nodes i' in each connection pair ii', and the primary network also includes directional orthogonal low-rate control channels and back channels in each connection pair ii', and wherein an adjoint network is defined by a wireless data traffic of the signaling data in the interfering transmission channel from the receive nodes i' to the transmit nodes i in each connection pair ii', the receive node being configured for alternately using, during the wireless data traffic, the primary network and the adjoint network for providing the information on the current power state in the network necessary for iterative calculation of the search direction in a selected iterative optimization algorithm, by receiving, in the primary network, a signal resulting from a synchronous transmission of data symbols and pilot symbols, via the interfering transmission channel, in a time pattern agreed upon among all transmit nodes i, from the transmit nodes i to the receive nodes i' in the connection pairs ii', determining a signal to interference ratio or a function dependent thereon at the associated receive node by notification via the pilot or data symbols, transmitting the signal to interference ratio, or the function dependent thereon, to the associated transmit node via the control channel, and transmitting, in the adjoint network, signaling data synchronously to the other receive nodes, via the interfering transmission channel, in a time pattern agreed upon among all receive nodes i', with the signaling data predistorted, using the signal to interference ratio, or the function dependent thereon.

6. Wireless network with decentralized allocation of online transmission power according to an iterative algorithm designed according to the best-effort principle for elastic data traffic, the wireless network comprising transmit nodes i and receive nodes i', which form current, directly connected connection pairs ii', and an interfering transmission channel, the reciprocal transmission behavior of which is known at the receive nodes i', wherein a primary network is defined by a wireless data traffic of information data to be transmitted and network-controlling signaling data in the interfering transmission channel from the transmit nodes i to the receive nodes i' in each connection pair ii', and the primary network also includes directional orthogonal low-rate control channels and back channels in each connection pair ii', and wherein an adjoint network is defined by a wireless data traffic of the signaling data in the interfering transmission channel from the receive nodes i' to the transmit nodes i in each connection pair ii', wherein the wireless network is configured such that the primary network and the adjoint network are alternately used, during the wireless data traffic, for providing the information on the current power state in the network necessary for iterative calculation of the search direction in a selected iterative optimization algorithm, by, in the primary network, globally synchronously transmitting signaling data via the interfering transmission channel in a time pattern agreed between all transmit nodes i, locally transmitting signaling data via the control channels in each connection pair ii' with respect to the changeable weighting of the connection priorities, locally transmitting signaling data via the back channels in each connection pair ii' with respect to the current state of the transmission channel and performing a first transmission power matching in the transmit nodes i and, in the adjoint network, predistorting the signaling data at the receive nodes i' for compensating the influence of the transmission channel respectively formed in a connection pair ii' on the interfering transmission channel, globally synchronously transmitting the predistorted signaling data in a time pattern agreed between all receive nodes i' via the interfering transmission channel to the transmit nodes i in the connection pairs ii', and calculating, in the transmit nodes i, from the received predistorted signaling data, the information on the power state in the network needed for calculating the i-th search direction components in the selected iterative algorithm.

7. Wireless network of claim 6, wherein the optimization algorithm is a gradient-based algorithm and the information on the power state necessary for the calculation of the i-th gradient components in the selected iterative algorithm is determined in the determination in the transmit nodes.

8. Method of operating a transmit node for a wireless network with decentralized allocation of online transmission power according to an iterative algorithm designed according to the best-effort principle for elastic data traffic, the wireless network comprising transmit nodes i and receive nodes i' forming current directly connected connection pairs ii', and an interfering transmission channel whose reciprocal transmission behavior is known at the receive nodes i', wherein a primary network is defined by a wireless data traffic of information data to be transmitted and network-controlling signaling data in the interfering transmission channel from the transmit nodes i to the receive nodes i' in each connection pair ii', and the primary network also includes directional orthogonal low-rate control channels and back channels in each connection pair ii', and wherein an adjoint network is defined by a wireless data traffic of the signaling data in the interfering transmission channel from the receive nodes i' to the transmit nodes i in each connection pair ii', wherein, during the wireless data traffic, the primary network and the adjoint network are alternately used for providing the information on the current power state in the network necessary for iterative calculation of the search direction in a selected iterative optimization algorithm, by transmitting data symbols and pilot symbols synchronously to the other transmit nodes via the interfering transmission channel in a time pattern agreed between all transmit nodes i, receiving a signal to interference ratio or a function dependent thereon determined at the associated receive node by notification via the pilot or data symbols, locally via the control channel, receiving, in the adjoint network, a signal resulting from a synchronous transmission of signaling data, via the interfering transmission channel, in a time pattern agreed upon among all receive nodes i', from the receive nodes i' to the transmit nodes i in the connection pairs ii', which are predistorted for compensating the influence of the transmission channel respectively formed in a connection pair ii' on the interfering transmission channel, and determining, from the received predistorted signaling data, the information on the power state in the network needed for calculating the i-th search direction components in the selected iterative algorithm.

9. Method of operating a receive node for a wireless network with decentralized allocation of online transmission power according to an iterative algorithm designed according to the best-effort principle for elastic data traffic, the wireless network comprising transmit nodes i and receive nodes i' forming current directly connected connection pairs ii', and an interfering transmission channel whose reciprocal transmission behavior is known at the receive nodes i', wherein a primary network is defined by a wireless data traffic of information data to be transmitted and network-controlling signaling data in the interfering transmission channel from the transmit nodes i to the receive nodes i' in each connection pair ii', and the primary network also includes directional orthogonal low-rate control channels and back channels in each connection pair ii', and an adjoint network is defined by a wireless data traffic of the signaling data in the interfering transmission channel from the receive nodes i' to the transmit nodes i in each connection pair ii', wherein, during the wireless data traffic, the primary network and the adjoint network are alternately used for providing the information on the current power state in the network necessary for iterative calculation of the search direction in a selected iterative optimization algorithm, by receiving, in the primary network, a signal resulting from a synchronous transmission of data symbols and pilot symbols, via the interfering transmission channel, in a time pattern agreed upon among all transmit nodes i, from the transmit nodes i to the receive nodes i' in the connection pairs ii', determining a signal to interference ratio or a function dependent thereon by notification via the pilot or data symbols, transmitting the signal to interference ratio, or the function dependent thereon, to the associated transmit node via the control channel, and transmitting, in the adjoint network, signaling data synchronously to the other receive nodes, via the interfering transmission channel, in a time pattern agreed upon among all receive nodes i', with the signaling data pre-distorted, using the signal to interference ratio, or the function dependent thereon.

* * * * *